(12) United States Patent
Pi et al.

(10) Patent No.: US 9,886,613 B2
(45) Date of Patent: Feb. 6, 2018

(54) INTEGRATION OF TOUCH SCREEN AND FINGERPRINT SENSOR ASSEMBLY

(71) Applicant: Shenzhen Huiding Technology Co., Ltd., Shenzhen (CN)

(72) Inventors: Bo Pi, Carlsbad, CA (US); Yi He, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 9 days.

(21) Appl. No.: 14/792,588

(22) Filed: Jul. 6, 2015

(65) Prior Publication Data

US 2016/0004899 A1    Jan. 7, 2016

Related U.S. Application Data

(60) Provisional application No. 62/021,632, filed on Jul. 7, 2014.

(51) Int. Cl.
*G06K 9/00* (2006.01)
*G06F 1/16* (2006.01)

(52) U.S. Cl.
CPC .......... *G06K 9/0002* (2013.01); *G06F 1/1626* (2013.01); *G06F 1/1643* (2013.01); *G06F 1/1684* (2013.01); *G06K 9/00053* (2013.01)

(58) Field of Classification Search
CPC .......... G06K 9/00053; G06K 19/07354; H04L 63/0861; H04L 9/3231; G06F 21/32; G06F 3/044; G06F 2203/0338
See application file for complete search history.

(56) References Cited

U.S. PATENT DOCUMENTS

| 5,732,148 A | 3/1998 | Keagy et al. |
| 6,011,859 A | 1/2000 | Kalnitsky et al. |

(Continued)

FOREIGN PATENT DOCUMENTS

| KR | 2012-0140016 A | 12/2012 |
| WO | 2015/077733 A1 | 5/2015 |
| WO | 2015/081326 A1 | 6/2015 |

OTHER PUBLICATIONS

International Search Report and Written Opinion dated Oct. 5, 2015 for International Application No. PCT/US2015/039273, filed on Jul. 6, 2015 (11 pages).

(Continued)

*Primary Examiner* — Gerald Johnson
(74) *Attorney, Agent, or Firm* — Perkins Coie LLP

(57) ABSTRACT

Devices, systems, and techniques are provided for integrating a touch screen with a fingerprint detection module as an assembly for a mobile device. The integrated touch screen/fingerprint sensor assembly includes at least two glass layers bonded together to provide overall mechanical strength for the touch screen display. The upper glass layer is a toughened/hardened cover glass that does not have an opening for fitting the fingerprint detection module through this glass layer. The lower glass layer is a support glass layer underneath the hardened cover glass to provide additional mechanical strength and to include an opening at a location close to an end of the support glass layer. The integrated touch screen/fingerprint sensor assembly also includes a fingerprint detection module positioned within the opening of the support glass layer and directly underneath the hardened cover glass.

43 Claims, 7 Drawing Sheets

(56) References Cited

U.S. PATENT DOCUMENTS

| | | |
|---|---|---|
| 6,501,846 B1 | 12/2002 | Dickinson et al. |
| RE45,601 E | 7/2015 | Dean et al. |
| 2001/0025532 A1 | 10/2001 | Kramer |
| 2003/0055785 A1 | 3/2003 | Lahiri |
| 2005/0008197 A1 | 1/2005 | Dennis |
| 2005/0221798 A1 | 10/2005 | Sengupta et al. |
| 2005/0263596 A1 | 12/2005 | Nelson et al. |
| 2007/0232929 A1 | 10/2007 | Kilgore et al. |
| 2007/0299322 A1 | 12/2007 | Miyajima et al. |
| 2008/0122803 A1 | 5/2008 | Izadi et al. |
| 2009/0083850 A1 | 3/2009 | Fadell et al. |
| 2009/0088197 A1 | 4/2009 | Stewart |
| 2009/0252384 A1 | 10/2009 | Dean et al. |
| 2009/0252386 A1 | 10/2009 | Dean et al. |
| 2010/0148068 A1 | 6/2010 | Schwaneberg et al. |
| 2010/0220900 A1 | 9/2010 | Orsley |
| 2011/0102346 A1 | 5/2011 | Orsley et al. |
| 2011/0102567 A1 | 5/2011 | Erhart |
| 2011/0227856 A1 | 9/2011 | Corroy et al. |
| 2011/0317886 A1 | 12/2011 | Matsuoka |
| 2012/0050988 A1 | 3/2012 | Rothkopf et al. |
| 2012/0090757 A1 | 4/2012 | Buchan et al. |
| 2012/0242635 A1 * | 9/2012 | Erhart .................. G06F 1/1626 345/207 |
| 2012/0258773 A1 † | 10/2012 | Alvarez |
| 2013/0097079 A1 | 4/2013 | Bruder |
| 2013/0108124 A1 † | 5/2013 | Wickboldt |
| 2013/0129162 A1 | 5/2013 | Cheng et al. |
| 2013/0177220 A1 | 7/2013 | Erhart et al. |
| 2013/0181949 A1 | 7/2013 | Setlak |
| 2013/0194071 A1 | 8/2013 | Slogedal et al. |
| 2013/0211291 A1 | 8/2013 | Tran |
| 2013/0231046 A1 | 9/2013 | Pope et al. |
| 2013/0258086 A1 | 10/2013 | Erhart et al. |
| 2013/0259329 A1 | 10/2013 | Wickboldt et al. |
| 2013/0265137 A1 † | 10/2013 | Nelson |
| 2013/0307818 A1 | 11/2013 | Pope et al. |
| 2014/0002237 A1 | 1/2014 | Infante et al. |
| 2014/0093145 A1 | 4/2014 | Feekes |
| 2014/0103943 A1 | 4/2014 | Dunlap et al. |
| 2014/0139978 A1 | 5/2014 | Kwong |
| 2014/0268516 A1 | 9/2014 | Fathollahi et al. |
| 2014/0270413 A1 | 9/2014 | Slaby et al. |
| 2014/0333328 A1 | 11/2014 | Nelson et al. |
| 2015/0071509 A1 | 3/2015 | Myers |
| 2015/0146944 A1 | 5/2015 | Pi et al. |
| 2015/0149310 A1 | 5/2015 | He et al. |
| 2015/0169932 A1 | 6/2015 | Riedijk et al. |
| 2015/0185954 A1 | 7/2015 | Chang |
| 2015/0195007 A1 | 7/2015 | He et al. |
| 2015/0242675 A1 | 8/2015 | Pope et al. |
| 2015/0363629 A1 * | 12/2015 | Lee .................. G06F 3/041 345/173 |

OTHER PUBLICATIONS

International Search Report and Written Opinion dated Mar. 10, 2015 for International Application No. PCT/US2014/067195, filed on Nov. 24, 2014 (8 pages).

International Search Report and Written Opinion dated Apr. 16, 2015 for International Application No. PCT/US2014/067828, filed on Nov. 28, 2014 (11 pages).

ECMA International, "Near Field Communication—Interface and Protocol (NFCIP-1)," 52 pages, Jun. 2013.

* cited by examiner
† cited by third party

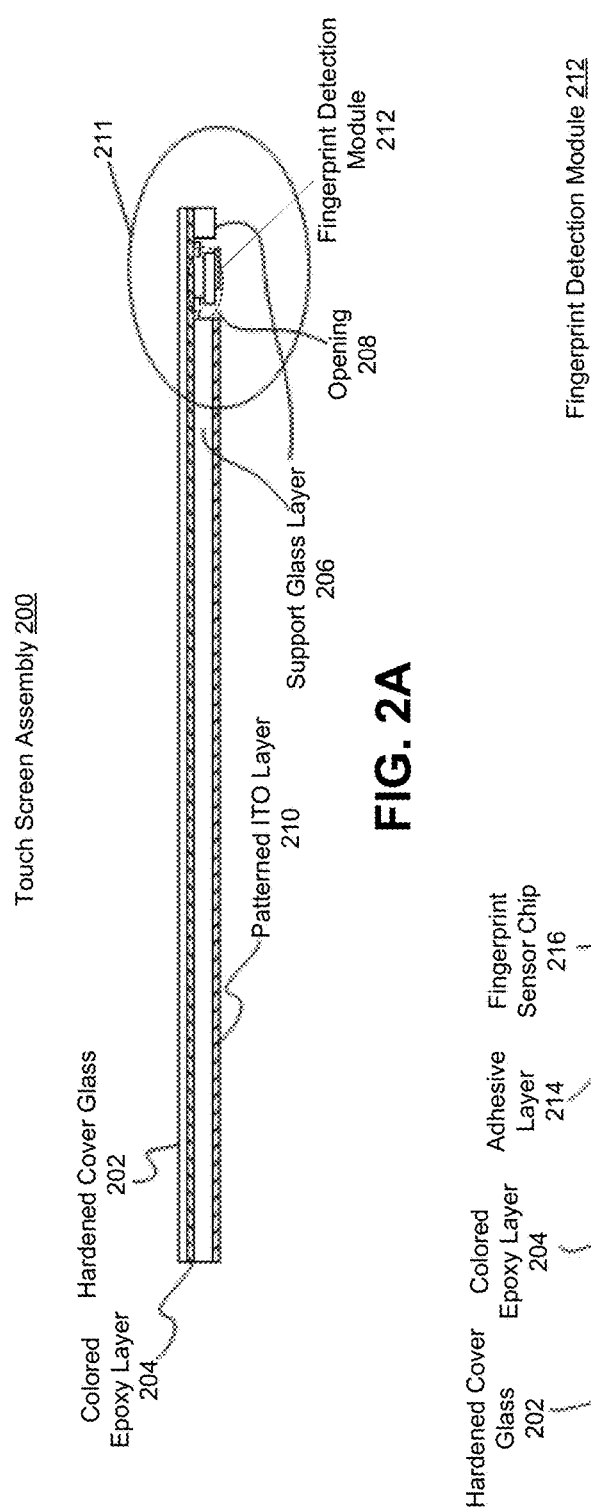
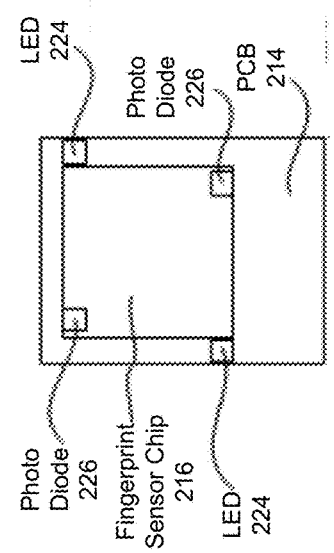
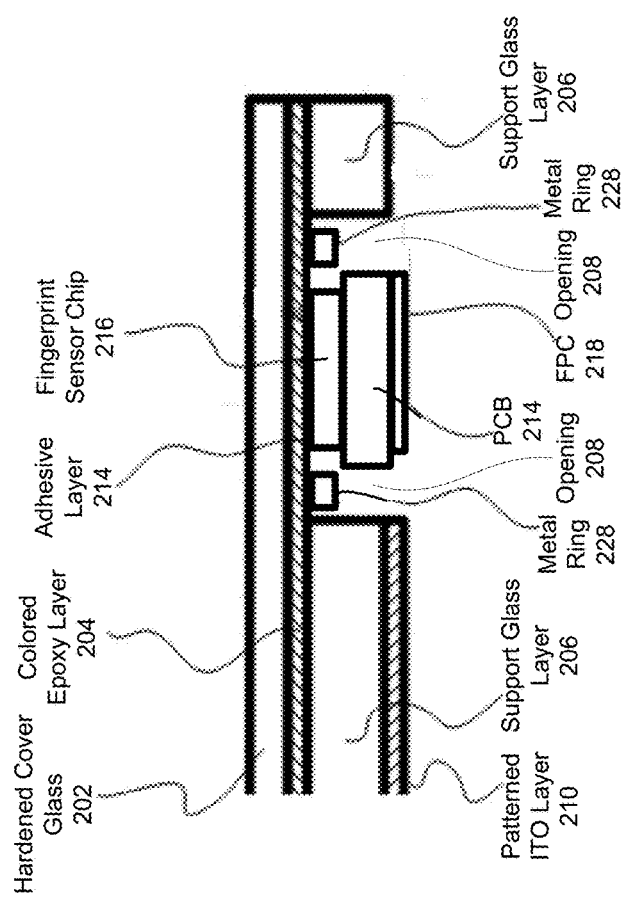

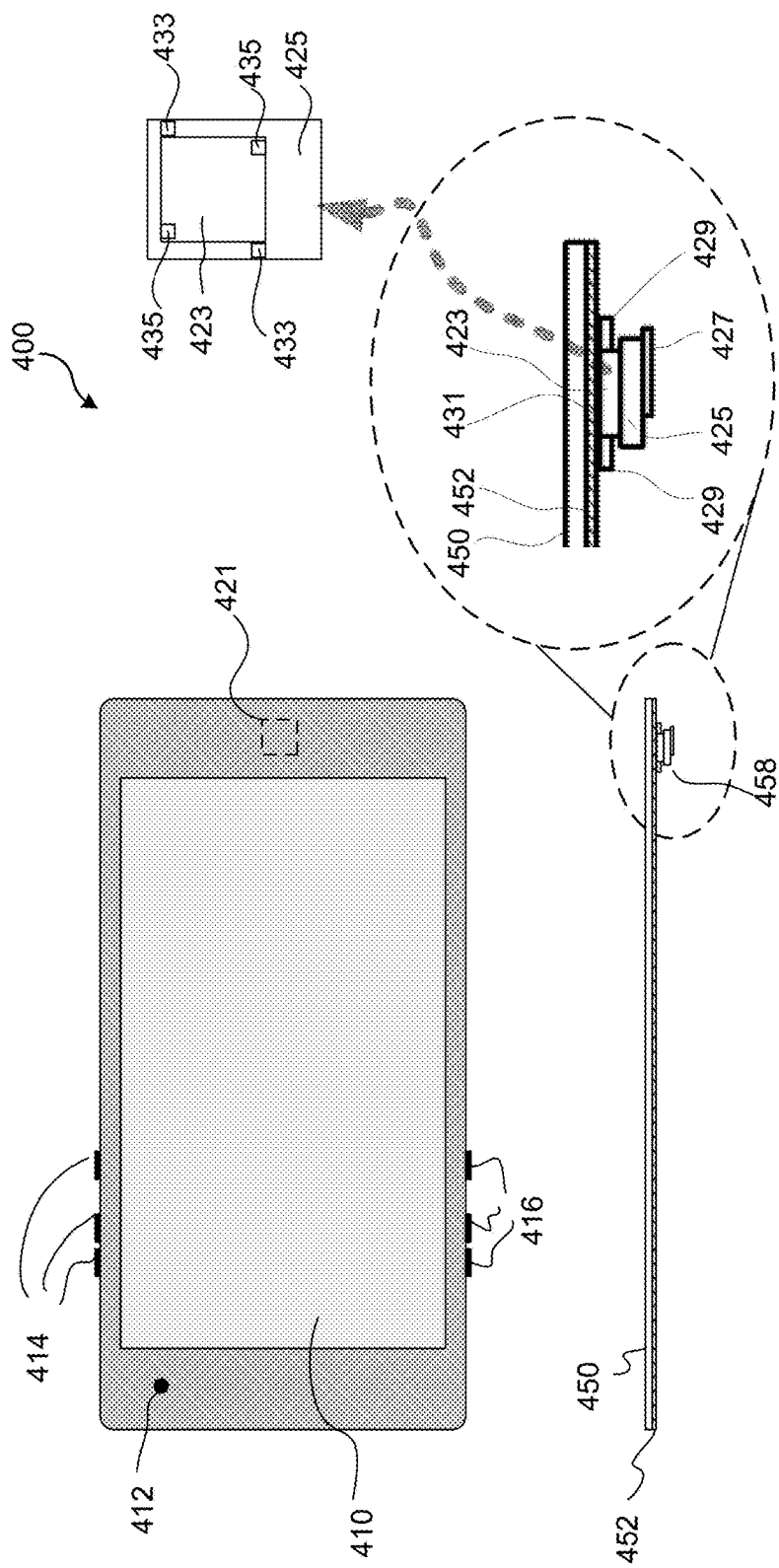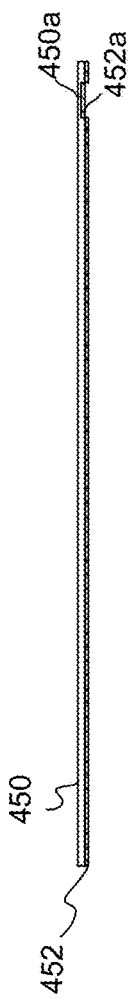
FIG. 4A
FIG. 4B

INTEGRATION OF TOUCH SCREEN AND FINGERPRINT SENSOR ASSEMBLY

CROSS REFERENCE TO RELATED APPLICATIONS

This patent document claims the benefit of priority of U.S. Provisional Patent Application No. 62/021,632, filed on Jul. 7, 2014. The entire content of the before-mentioned patent application is incorporated by reference as part of the disclosure of this document.

TECHNICAL FIELD

This patent document relates to touch screen devices and technologies.

BACKGROUND

Users of portable computing devices, such as laptops, tablets, smartphones, and gaming systems routinely employ owner authentications on their devices to protect personal data and prevent unauthorized access. To meet the growing security and privacy needs of the users, owner authentication of an electronic device may be carried out through one or multiple forms of biometric identifiers, which can be used in addition to conventional password authentication methods. A popular form of biometric identifiers is a person's fingerprint pattern. A fingerprint sensor can be built into the electronic device to read a person's fingerprint pattern so that the device can only be unlocked by the device owner through authentication of an authorized person's fingerprint pattern. Notably, a fingerprint sensor can be built into a smartphone with a touch screen so that a screen-locked smartphone can be unlocked by simply touching a button with a finger without entering a passcode.

SUMMARY

This patent document discloses devices and techniques that integrate a fingerprint detection module and a touch screen structure, including devices, systems, and techniques that physically integrates a touch screen and a fingerprint detection module as an assembly for various devices including a mobile device or a portable device. The integrated touch screen/fingerprint sensor assembly includes at least two glass layers bonded together to provide overall mechanical strength for the touch screen display. The upper glass layer is a toughened/hardened cover glass that does not have an opening for fitting the fingerprint detection module through this glass layer. The lower glass layer is a support glass layer underneath the hardened cover glass to provide additional mechanical strength. Moreover, the support glass layer includes an opening at a location close to an end of the support glass layer. The integrated touch screen/fingerprint sensor assembly also includes a fingerprint detection module positioned within the opening of the support glass layer and directly underneath the hardened cover glass. The integrated touch screen/fingerprint sensor assembly also includes a fingerprint sensor mark formed on the surface of the hardened cover glass and located directly above the fingerprint detection module to indicate the position of the fingerprint detection module. The proposed screen/fingerprint sensor assembly eliminates the large through-hole in the hardened cover glass at the fingerprint sensor location, thereby improving the device appearance and fingerprint sensor performance and reliability, saving space, and greatly reducing the manufacturing cost.

In one aspect, a touch screen/fingerprint sensor assembly is provided to include a touch screen panel and a fingerprint sensor displaced from and near the touch screen panel; a hardened cover glass located on top of the touch screen/fingerprint sensor assembly to have a spatially contiguous glass surface to fully cover both the touch screen panel and a fingerprint sensor displaced from and near the touch screen panel; and a support glass layer underneath the hardened cover glass and including an opening through the support glass layer. The hardened cover glass and the support glass layer are bonded to provide a desired mechanical strength for the touch screen assembly. The fingerprint sensor is positioned within the opening of the support glass layer and directly underneath the hardened cover glass to sense a contact by an object, such as a finger, through the hardened cover glass.

In another aspect, a touch screen/fingerprint sensor assembly for a mobile device includes a hardened cover glass at the top of the touch screen/fingerprint sensor assembly. The touch screen/fingerprint sensor assembly also includes a support glass layer underneath the hardened cover glass to include an opening. The hardened cover glass and the support glass layer are bonded to provide required mechanical strength for the touch screen/fingerprint sensor assembly. The touch screen/fingerprint sensor assembly additionally includes a fingerprint detection module positioned within the opening of the support glass layer and directly underneath the hardened cover glass.

In some implementations, the touch screen/fingerprint sensor assembly also includes a fingerprint sensor mark formed on the surface of the hardened cover glass and located directly above the fingerprint detection module to indicate the position of the fingerprint detection module.

In another aspect, a touch screen electronic device integrated with a fingerprint detection mechanism includes a frame, and a touch screen/fingerprint sensor assembly surrounded and secured by the frame. The touch screen/fingerprint sensor assembly further includes: hardened cover glass at the top of the touch screen/fingerprint sensor assembly and for receiving contact by an object; a support glass layer underneath the hardened cover glass and including an opening through the support glass layer, wherein the hardened cover glass and the support glass layer are bonded to provide required mechanical strength for the touch screen assembly; and a fingerprint detection module positioned within the opening of the support glass layer and directly underneath the hardened cover glass. The touch screen electronic device also includes a main circuit board between the touch screen/fingerprint sensor assembly and the back cover of the frame.

In yet another aspect, a technique for assembling a touch screen/fingerprint sensor assembly includes the steps of: preparing a hardened cover glass without forming an opening for accommodating an fingerprint detection module; preparing a support glass layer by forming an opening for accommodating an fingerprint detection module; bonding the hardened cover glass and the support glass layer, wherein the hardened cover glass and the support glass layer collectively provide required mechanical strength for the touch screen assembly; and placing a fingerprint detection module within the opening of the support glass layer and attaching the fingerprint detection module directly underneath the hardened cover glass.

The above and other aspects and their implementations are described in greater detail in the attached drawings, the description and the claims.

BRIEF DESCRIPTION OF THE DRAWINGS

FIG. 2A shows schematics of a touch screen assembly integrated with a fingerprint detection module for various devices including a mobile device or a portable device based on the technology disclosed in this document.

FIG. 2B shows a zoom in view of the region in FIG. 2A indicated by the circle that includes the opening and the fingerprint sensor module in accordance with some embodiments described herein.

FIG. 2C shows a schematic in a top view of fingerprint sensor module 212 in accordance with some embodiments described herein.

FIGS. 4A-4B show a top view and a side (cross-sectional) view of an exemplary implementation of a simplified hardened cover glass in a touch screen assembly, a fingerprint sensor assembly, or an integrated touch screen and fingerprint sensor assembly.

Similar reference numbers represent similar components throughout the figures.

DETAILED DESCRIPTION

Figure 1:
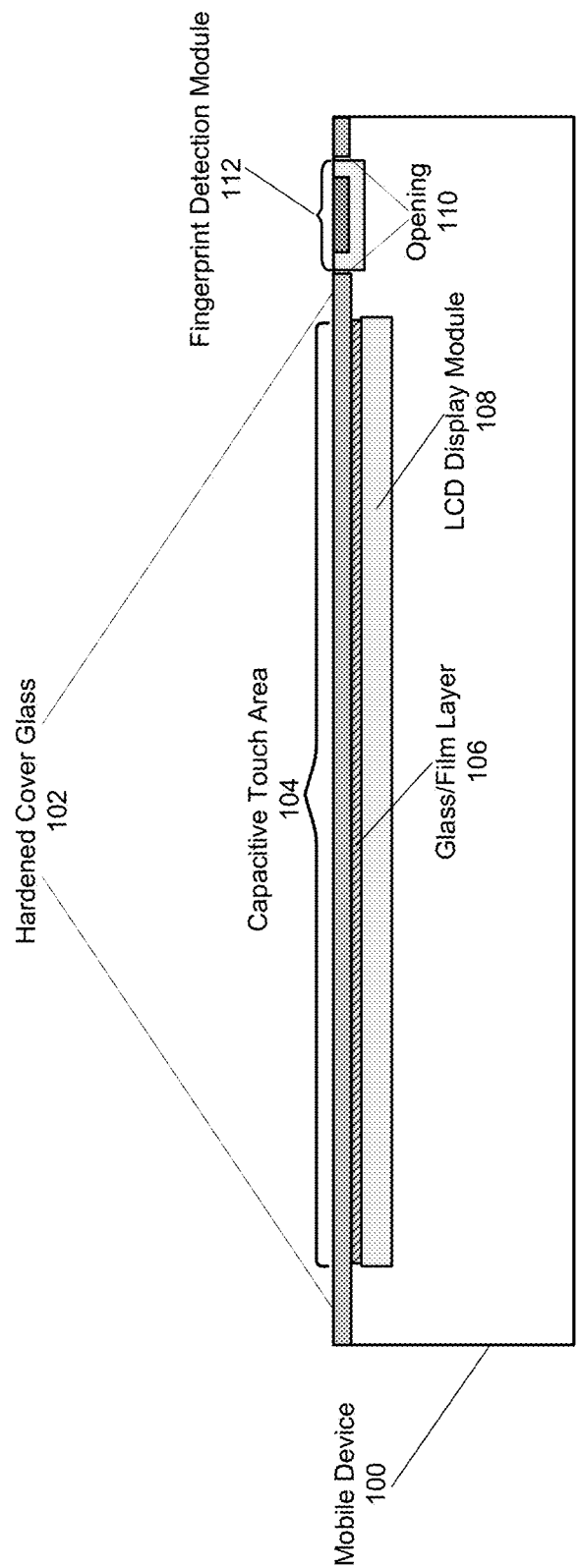
FIG. 1 shows a schematic in a cross-sectional view of a mobile device 100 equipped with a touch screen and a fingerprint sensor.

Electronic devices including mobile devices such as smartphones, tablets, and notebook computers equipped with fingerprint authentication mechanisms are becoming a commonplace. More users will eventually acquire mobile devices equipped with fingerprint detection capabilities. Currently, some mobile devices equipped with both a touch screen display and a fingerprint detection module physically separate the touch screen area and the fingerprint detection module in different regions of the device surface. Moreover, the fingerprint detection module is placed on the device surface by fitting inside a through-hole in the cover glass. This design requires that the cover glass to be relatively thick and the hole to be highly precise with very little manufacturing tolerance. The appearance of the fingerprint detection module that resembles a mechanical button does not have visual appeal to users who are used to touch screen devices without a mechanical button.

Embodiments described in this document provide devices, systems, and techniques that physically integrate a touch screen with a fingerprint detection module as an assembly for a mobile device. The integrated touch screen/fingerprint sensor assembly includes at least two glass layers bonded together to provide overall mechanical strength for the touch screen display. The upper glass layer is a toughened/hardened cover glass that does not have an opening for fitting the fingerprint detection module through this glass layer. The lower glass layer is a support glass layer underneath the hardened cover glass to strengthen the overall mechanical structure of the touch screen-fingerprint sensor assembly. Moreover, the support glass layer includes an opening at a location close to an end of the support glass layer. The integrated touch screen/fingerprint sensor assembly also includes a fingerprint detection module positioned within the opening of the support glass layer and directly underneath the hardened cover glass. The integrated touch screen/fingerprint sensor assembly also includes a fingerprint sensor mark formed on the surface of the hardened cover glass and located directly above the fingerprint detection module to indicate the position of the fingerprint detection module. This design of the integrated screen/fingerprint sensor assembly eliminates the large through-hole in the hardened cover glass at the fingerprint sensor location, thereby improving the device appearance and fingerprint sensor performance and reliability, saving space, and greatly reducing the manufacturing cost.

In one aspect, a touch screen/fingerprint sensor assembly for a mobile device includes a hardened cover glass at the top of the touch screen/fingerprint sensor assembly. The touch screen/fingerprint sensor assembly also includes a support glass layer underneath the hardened cover glass to include an opening. The hardened cover glass and the support glass layer are bonded to provide required mechanical strength for the touch screen/fingerprint sensor assembly. The touch screen/fingerprint sensor assembly additionally includes a fingerprint detection module positioned within the opening of the support glass layer and directly underneath the hardened cover glass.

In some implementations, the touch screen/fingerprint sensor assembly also includes a fingerprint sensor mark formed on the surface of the hardened cover glass and located directly above the fingerprint detection module to indicate the position of the fingerprint detection module.

In another aspect, a touch screen electronic device integrated with a fingerprint detection mechanism includes a frame, and a touch screen/fingerprint sensor assembly surrounded and secured by the frame. The touch screen/fingerprint sensor assembly further includes: hardened cover glass at the top of the touch screen/fingerprint sensor assembly and for receiving contact by an object; a support glass layer underneath the hardened cover glass and including an opening through the support glass layer, wherein the hardened cover glass and the support glass layer are bonded to provide required mechanical strength for the touch screen assembly; and a fingerprint detection module positioned within the opening of the support glass layer and directly underneath the hardened cover glass. The touch screen electronic device also includes a main circuit board between the touch screen/fingerprint sensor assembly and the back cover of the frame.

In yet another aspect, a technique for assembling a touch screen/fingerprint sensor assembly includes the steps of: preparing a hardened cover glass without forming an opening for accommodating an fingerprint detection module; preparing a support glass layer by forming an opening for accommodating an fingerprint detection module; bonding the hardened cover glass and the support glass layer, wherein the hardened cover glass and the support glass layer collectively provide required mechanical strength for the touch screen assembly; and placing a fingerprint detection module within the opening of the support glass layer and attaching the fingerprint detection module directly underneath the hardened cover glass.

FIG. 1 shows a schematic in a cross-sectional view of a mobile device 100 equipped with a touch screen and a fingerprint sensor. The mobile device 100 includes a toughened or "hardened" cover glass 102 that is a spatially contiguous piece and covers the entire surface of the mobile device. Hardened cover glass 102 includes a capacitive touch area 104 that occupies a major part of the surface area of the mobile device 100 and that provides the touch sensitive surface due to presence of an underlying touch screen display assembly. Specifically, capacitive touch area 104 is positioned over a thin glass/film layer 106 and an LCD display module 108 to form the touch screen display assembly, wherein the thin glass/film layer 106 underneath the capacitive touch area 104 of the hardened cover glass 102 is in contact with the capacitive touch area 104 to receive contact for capacitive touch sensing. More specifically, one or both surfaces of the thin glass/film layer 106 are coated with patterned indium tin oxide (ITO) layer to enable capacitive touch sensing functions. Note that hardened cover glass 102 is designed to provide the mechanical support for and the desired mechanical strength to the touch screen structure.

Hardened cover glass 102 includes an opening 110 at a location outside capacitive touch area 104 to fit a fingerprint detection module 112 through. This fingerprint detection module 112 includes a top fingerprint sensing surface that fits in the opening 110 and operates based on direct touching of the top sensing surface by a finger for sensing the fingerprint on the touched portion. The surface of the fingerprint detection module 112 is exposed through the opening 110 for receiving direct contact of a finger. Opening 110 may be located near an edge of hardened cover glass 102. Making such an opening 110 through the relatively thick (e.g., 550 µm-750 µm) cover glass requires very high precision and can have negative impact on the manufacturing yield. In some embodiments, opening 110 is formed in a cover glass prior to the hardening process to produce the hardened cover glass 102.

FIG. 2A shows schematics of a touch screen assembly integrated with a fingerprint detection module for various devices including a mobile device or a portable device based on the technology disclosed in this document. Different from the design in FIG. 1, the top hardened cover glass does not have an opening to expose the top fingerprint sensing surface. Instead, the fingerprint sensor is entirely hidden below the top hardened cover glass without being directly exposed through an opening and is designed to sense a fingerprint of a finger without being directly in contact with the finger. More specifically, FIG. 2A shows a schematic in a cross-sectional view of a touch screen assembly 200 for a mobile device which integrates a touch screen and a fingerprint detection module in accordance with some embodiments described herein. As can be seen in FIG. 2A, touch screen assembly 200 includes a hardened cover glass 202 for protecting the touch sensitive area of the touch screen assembly and the other areas of the surface beyond the touch sensitive area, including the location above the fingerprint sensor. The fingerprint sensor in this design can sense the fingerprint by a fingerprint in touch with the top surface of the hardened cover glass 202 without being in direct contact with the top of the fingerprint sensor. This allows the hardened cover glass 202 to fully cover both the touch screen assembly and the fingerprint sensor under a spatially contiguous glass surface without an opening. In some embodiments, hardened cover glass 202 has a thickness between 100 µm to 400 µm. The choice for hardened cover glass 202 thickness is discussed further below. Hardened cover glass 202 may be made with substantially the same material and/or process as hardened cover glass 102 in the mobile device illustrated in FIG. 1. However, compared with hardened cover glass 102, hardened cover glass 202 includes a number of differences.

Notably, hardened cover glass 202 does not include an opening for fitting a fingerprint detection module as in hardened cover glass 102. Due to elimination of the process of drilling the opening for the fingerprint sensor, the machining of hardened cover glass 202 can be significantly simpler than the machining of hardened cover glass 102 with an opening in FIG. 1. In addition, eliminating the opening also allows for more flexible choices of the cover glass material, for example, less expensive material than sapphire can be used for hardened cover glass 202. The simplified manufacturing of hardened cover glass 202 also allows the hardened cover glass 202 thickness to be significantly less than the hardened cover glass 102 thickness. For example, hardened cover glass 202 may be made as thin as possible without compromising mechanical integrity. A thinner hardened cover glass 202 may facilitate reducing manufacturing cost and processing time. In some embodiments, the underside (i.e., the surface opposite to the touch surface) of hardened cover glass 202 is coated with a colored epoxy layer 204 which can be black, white, or other colors. The colored epoxy layer 204 can also be configured with specific patterns.

Further referring to FIG. 2A, touch screen assembly 200 also includes a support glass layer 206 underneath the hardened cover glass 202, wherein support glass layer 206 includes a through-hole, or opening 208 (an enlarged view of opening 208 in support glass layer 206 can be seen in FIG. 2B). In some embodiments, support glass layer 206 has a thickness between 100 µm to 400 µm. The thickness of the support glass layer 206 can be greater or less than the thickness of hardened cover glass 202. In some implementations, the thickness of the support glass layer 206 can be significantly greater than the thickness of hardened cover glass 202. The location of opening 208 on support glass layer 206 may be close to an end of support glass layer 206, similar to the relative location of opening 110 on hardened cover glass 102 in FIG. 1. In some embodiments, the size of opening 208 is greater than 5 mm×5 mm, and the shape of opening 208 can include square, circular, among others. Support glass layer 206 can be either tempering/toughening processed or without going through a toughening process. If a toughening process is used, it typically takes place after the opening 208 has been machined. The bottom side of support glass layer 206 is coated with a patterned ITO layer 210 which defines the region on hardened cover glass 202 having touch sensing functions.

As shown in FIG. 2A, hardened cover glass 202 and support glass layer 206 are bonded together to form an overall cover glass structure that is significantly thicker and mechanically stronger than each of hardened cover glass 202 and support glass layer 206 individually. The two glass layers may be bonded with a thin adhesive layer, such as an epoxy adhesive layer. The overall thickness of the combined structure may be comparable to the hardened cover glass 102 in FIG. 1.

Touch screen assembly 200 also includes a fingerprint sensor module 212 which is positioned within opening 208 of support glass layer 206 and directly attached underneath the hardened cover glass 202. Fingerprint sensor module 212 may be glued onto hardened cover glass 202 through opening 208 at the same time when hardened cover glass 202 and support glass layer 206 are bonded together. Alternatively, fingerprint sensor module 212 may be glued onto hardened cover glass 202 through opening 208 after support glass layer 206 has been bonded with hardened cover glass 202.

FIG. 2B shows a zoom in view of the region in FIG. 2A indicated by the circle 211 that includes the opening 208 and fingerprint sensor module 212 in accordance with some embodiments described herein. The fingerprint sensor module 212 is glued onto colored epoxy layer 204 by a very thin adhesive layer 214, such as an epoxy adhesive. Note that fingerprint sensor module 212 does not have to be snug-fitted inside opening 208, and can have a space between the module boundary and the sidewall of opening 208 as shown in FIG. 2B. This spacing allows for large integration tolerance during integration of fingerprint sensor module 212 with hardened cover glass 202 and support glass layer 206. Hence, hardened cover glass 202, support glass layer 206, and fingerprint sensor module 212 form an integrated touch screen/fingerprint detection assembly. In comparison, in the embodiment of FIG. 1, the fingerprint sensor module 102 is physically and mechanically separated from the touch screen structure.

In one implementation, fingerprint sensor module 212 includes a printed circuit board (PCB) 214 having integrated circuits, and a fingerprint sensor chip 216 for collecting fingerprint data, wherein the top surface of fingerprint sensor chip 216 is attached to colored epoxy layer 204, while the bottom surface of the fingerprint sensor chip 216 is affixed to the top surface of PCB 214. Fingerprint sensor module 212 also includes a flexible printed circuit (FPC) 218 attached to the bottom surface of PCB 214 for coupling fingerprint sensor signals collected by the fingerprint sensor chip 216 to a main circuit board (not shown) of the mobile device. Because fingerprint sensor chip 216 is positioned underneath hardened cover glass 202, fingerprint sensing is performed capacitively through the gap created by hardened cover glass 202, which creates a design constraint for the thickness of hardened cover glass 202. In one embodiment, hardened cover glass 202 thickness is determined as a trade-off between a higher sensitivity which prefers a thinner glass, and a higher mechanical strength which prefers a thicker glass 202.

FIG. 2C shows a schematic in a top view of fingerprint sensor module 212 in accordance with some embodiments described herein. As can be seen in FIG. 2C, fingerprint sensor module 212 includes discrete components such as light emitting diodes (LEDs) 224 that are affixed on the top surface of PCB 214. Fingerprint sensor module 212 also includes photodetectors, such as photo diodes 226 which are integrated with fingerprint sensor chip 216. The LEDs 224, photo diodes 226, and a signal processing module (not shown) collectively determine if an object making contact with the fingerprint sensor module 212 is human. Further detail of human detection using LEDs and photodetectors is described in U.S. Patent Application No. 61/908,026 entitled "HUMAN FINGERPRINT DETECTION MODULES" filed on Nov. 22, 2013, which is incorporated by reference as a part of the specification of this application. In addition to human detection, the discrete components such as LEDs 224 and the integrated photodetectors such as photo diodes 226 can also be used to monitor human bio-feature signals, such as heartbeat, oxygen saturation level of the user's blood ($SpO_2$), among others.

Fingerprint detection module 212 can also include a metal ring 228 placed around fingerprint sensor chip 216 and attached to colored epoxy layer 204. Similarly to the rest of fingerprint detection module 212, metal ring 228 can be glued onto colored epoxy layer 204 by a thin adhesive layer. In one embodiment, metal ring 228 is part of a capacitive touch sensor to detect contact by an object with the hardened cover glass 202. For example, metal ring 228 can serve as a sensing electrode to detect if a human finger or an object is making contact with fingerprint detection module 212. In some implementations, metal ring 228 can also serve as a signaling electrode. For example, in a device-to-device communication setup, metal ring 228 operates as a transmitting and receiving electrode for sending and receiving electrical signals to and from the capacitive coupling port of another capacitive touch screen.

In the embodiment of FIG. 2B, metal ring 228 is positioned entirely within the opening 208. This configuration has two consequences: the size of opening 208 has to be sufficiently large to accommodate metal ring 228; and metal ring 228 cannot have a very large size because the size of opening 208 affects the display area. However, a large metal ring is beneficial to increase capacitive sensing sensitivity, especially when the fingerprint sensor is positioned underneath hardened cover glass 202.

Figure 2D:
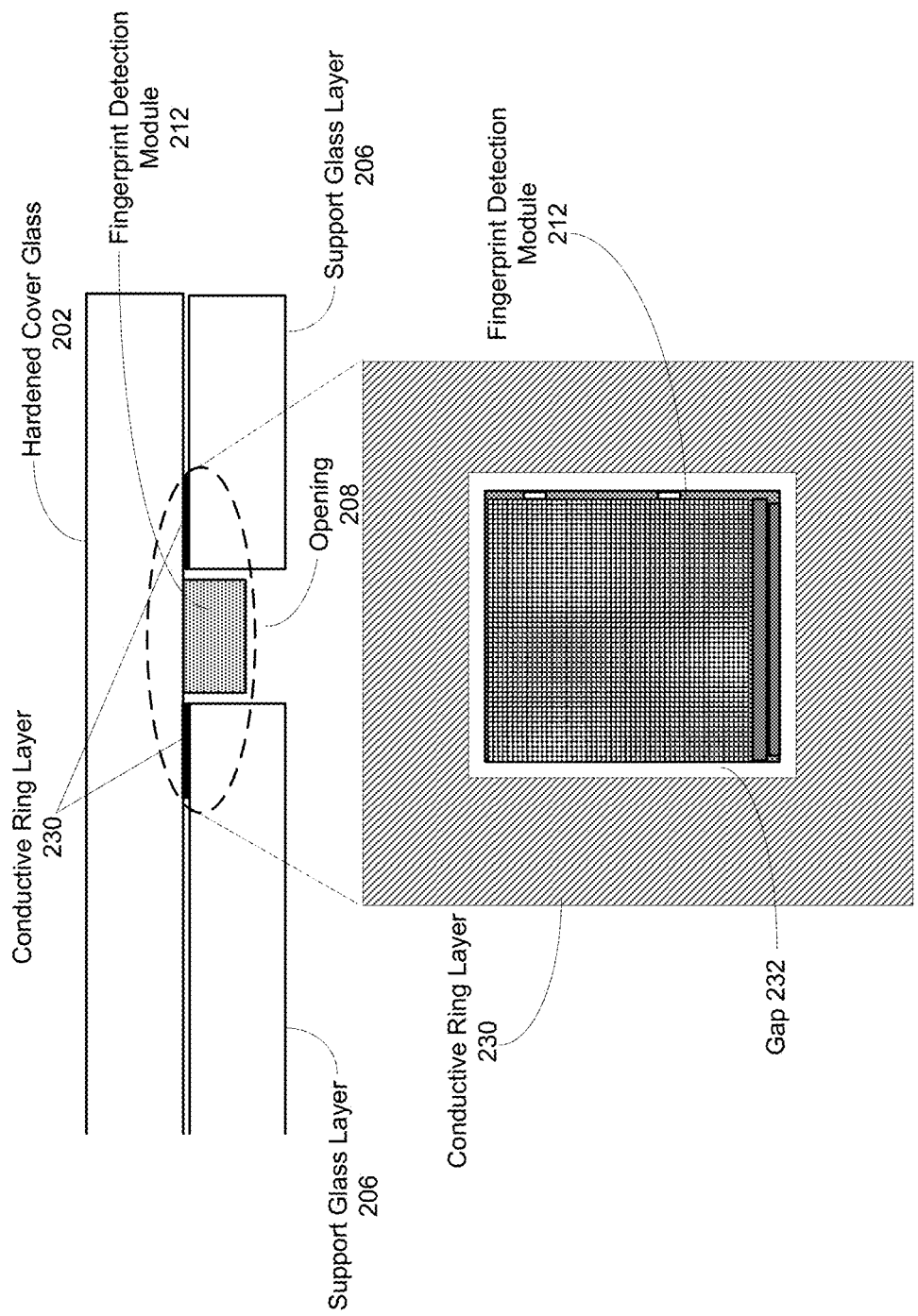
FIG. 2D shows an exemplary implementation of touch screen/fingerprint sensor assembly wherein the metal ring 228 in FIG. 2B is reconfigured as a conductive film.

FIG. 2D shows an exemplary implementation of touch screen/fingerprint sensor assembly wherein the metal ring 228 in FIG. 2B is reconfigured as a conductive film. As can be seen in FIG. 2D, a conductive ring layer 230 is sandwiched between hardened cover glass 202 and support glass layer 206. Opening 208 on support glass layer 206 can be made to be just big enough to accommodate fingerprint detection module 212 without a metal ring 228. Because conductive ring layer 230 is not confined within opening 208, the surface area of the ring layer 230 can be much bigger than metal ring 228. For example, FIG. 2D also shows a schematic in a top view of conductive ring layer 230 and fingerprint detection module 212. In one implementation, conductive ring layer 230 is screen-printed on the colored epoxy layer on hardened cover glass 202 and separated from fingerprint detection module 212 by a gap 232.

Figures 3A, 3B:
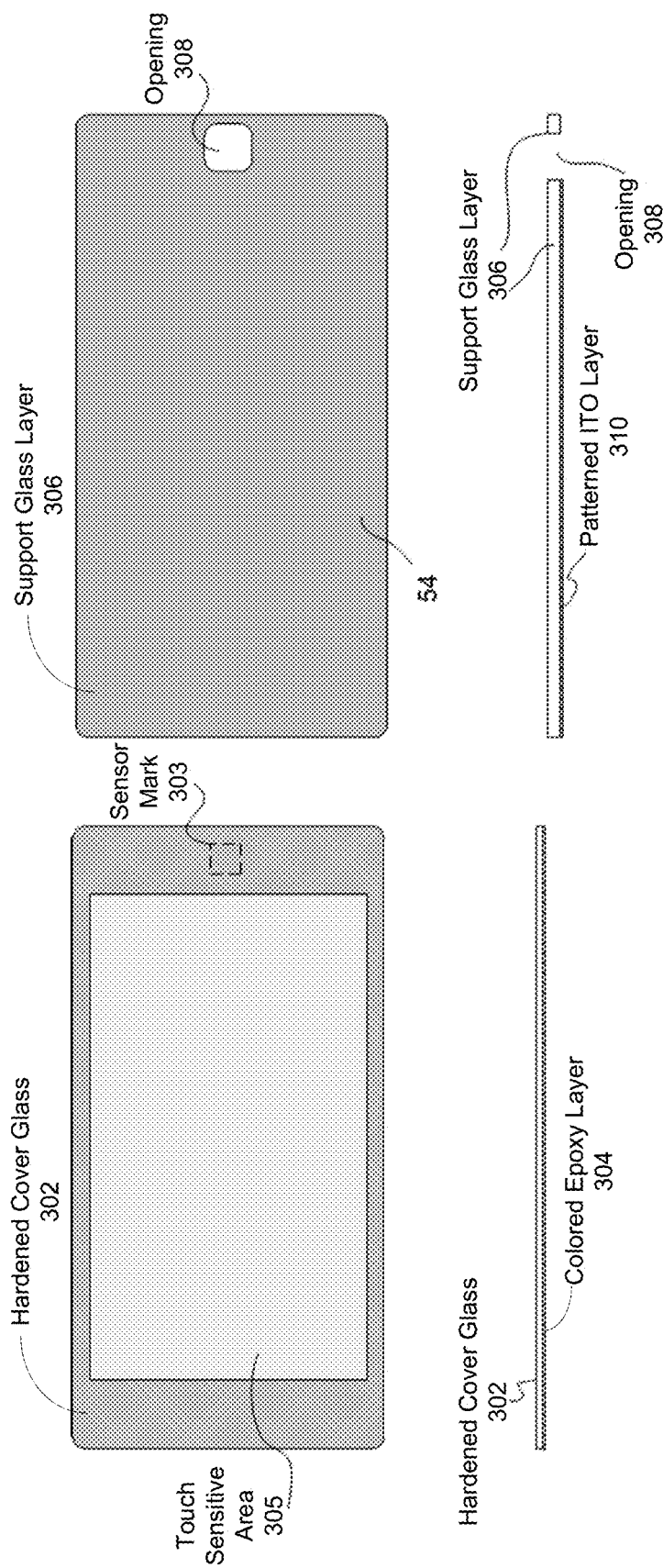
FIG. 3A shows both a top view and a side view of an exemplary implementation of the hardened cover glass in a touch screen/fingerprint sensor assembly.
FIG. 3B shows both a top view and a side view of an exemplary implementation of the support glass layer in a touch screen/fingerprint sensor assembly.

FIG. 3A shows both a top view and a side view of an exemplary implementation of the hardened cover glass in a touch screen/fingerprint sensor assembly. As shown in FIG. 3A, hardened cover glass 302 does not include an opening for fitting a fingerprint detection module through the hardened cover glass 302. However, the fingerprint sensor location is marked on hardened cover glass 302 with a sensor mark 303, for example, as a printed mark. Sensor mark 303 helps to guide the user's finger to where the fingerprint sensor chip is located underneath hardened cover glass 302. The bottom surface of hardened cover glass 302 is coated with a colored epoxy layer 304, which can be configured to hind a fingerprint detection module underneath hardened cover glass 302. Also note that the touch sensitive area 305 does not overlap the fingerprint sensor location.

FIG. 3B shows both a top view and a side view of an exemplary implementation of the support glass layer in a touch screen/fingerprint sensor assembly. As shown in FIG. 3B, support glass layer 306 includes an opening 308 which coincides with the location of sensor mark 303. The bottom surface of support glass layer 306 is coated with patterned ITO layer 310 which defines the region on hardened cover glass 302 that has touch sensing functions.

To obtain the touch screen/fingerprint sensor assembly shown in FIG. 2A, support glass layer 306 in FIG. 3B is bonded with hardened cover glass 302 in FIG. 3A, for example, with an epoxy adhesive, whereby the colored epoxy layer 304 is sandwiched between the two glass layers. Next, a fingerprint detection module is attached to the underside of hardened cover glass 302 through opening 308, for example, using the same epoxy adhesive to complete the touch screen/fingerprint sensor assembly. The disclosed multi-layer structure of the touch screen/fingerprint sensor assembly eliminates through-hole in the top glass layer at the fingerprint sensor location, improves the device appearance and fingerprint sensor performance and reliability, saves space, and greatly reduces the manufacturing cost.

Note that the integrated touch screen/fingerprint sensor assembly may be manufactured as a module at a facility different from the place of final mobile device integration. Because opening 308 is hidden from the user by colored epoxy layer 304, drilling opening 308 through support glass layer 306 does not require the same level of precisions (such as the opening location, dimensions, and roughness) as drilling opening 106 in FIG. 1, thereby reducing manufacture cost, processing time while improving yield.

FIGS. 4A and 4B show a top view and a side (cross-sectional) view of an exemplary implementation of a simplified hardened cover glass in a touch screen assembly, a fingerprint sensor assembly, or an integrated touch screen and fingerprint sensor assembly. In the implementation of the simplified hardened cover glass shown in FIGS. 4A and 4B, the structure of the hardened cover glass is simplified because the hardened cover glass is strong that a support glass layer is no longer needed. In absence of the support glass layer, circuitry for providing the touch sensing function (e.g., touch sensor or a fingerprint sensor or an integrated touch and fingerprint sensor) can be directly implement on the back surface of a cover glass 450 or on a polymer film bonded to the back surface of the cover glass 450. For an in-cell (i.e., display cell) touch solution, the circuitry for providing the touch sensing function is implemented or integrated on an LCD module placed or bonded on the back surface of the cover glass 450. By eliminating the support layers, the implement of the hardened cover glass to include the circuitry for providing touch sensing is greatly simplified.

The simplified hardened cover glass is shown to be implemented in a mobile device 400. For example, the hardened cover glass can be implemented as a part of a touch panel assembly 410 with an integrated fingerprint sensor module. On the mobile device 400, other sensor positions 412 are shown along with exemplary physical buttons 14 and 16 (e.g., side buttons). In some implementations, a fingerprint sensor mark 421 can be shown on or in proximity of the touch panel assembly 410. A fingerprint sensor chip 423 can be disposed on a back PCB with integrated circuitry 425. The back PCB 425 can be disposed over a flexible printed circuit (FPC) 27. In some implementations, a colored epoxy material layer 452 can provided on the back surface of the cover glass 450 to function as (1) a bonding material and (2) to provide a desired color appearance. A housing, such as a hole 458 for housing a fingerprint sensor module can be disposed under the cover glass 450 (and under the colored epoxy material layer 452 when included). In some implementations, a metal ring structure 429 can be attached under the covered glass 450 (and colored epoxy material layer 452 when included) and surrounding or bordering the fingerprint sensor chip 423. In some implementations, a thin epoxy material 431 can be implemented to glue the fingerprint sensor to the cover glass 450 (or colored epoxy material layer 452 when included). Discrete components 433, such as LEDs, can be fixed on the back of the PCB 425. In addition, optical detectors 435, such as photo diodes, can be disposed on either the PCB 425, the fingerprint sensor chip 423, or both the PCB 425 and the fingerprint sensor chip 423. In some implementations, the enhanced cover glass 450 can have a thickness of 100-300 µm.

FIG. 4B shows a side (cross-sectional) view of the simplified hardened cover glass that can be implemented in a touch screen assembly, a fingerprint sensor assembly, or an integrated touch screen and fingerprint sensor assembly. A portion of the enhanced cover glass 450 can be etched to form a sink structure (e.g., housing) to house or install the fingerprint sensor module, or just the fingerprint sensor chip component 423 of the fingerprint sensor module.

Figure 5:
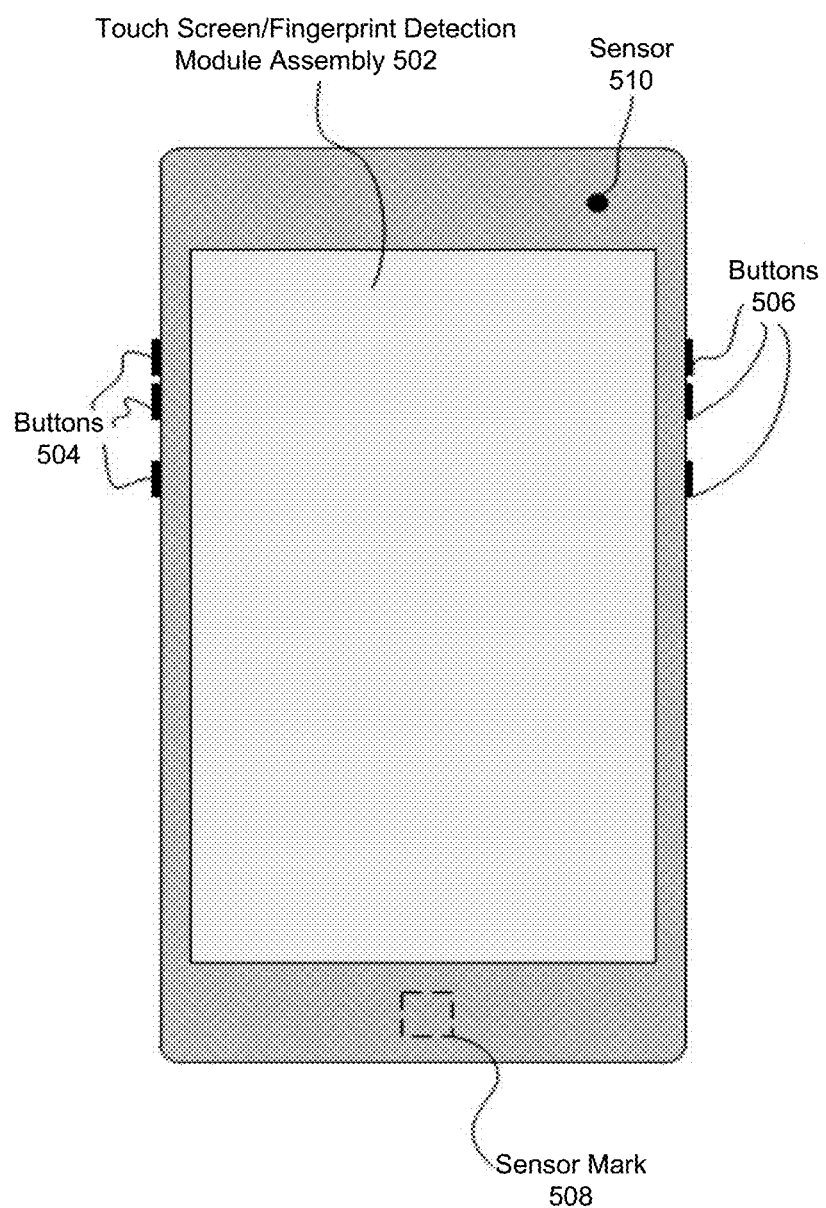
FIG. 5 shows a top-down view schematic of a mobile device (e.g., a smartphone, a tablet) equipped with an integrated touch screen/fingerprint sensor assembly in accordance with some embodiments described herein.

FIG. 5 shows a schematic in a top view of a mobile device 500 (e.g., a smartphone, a tablet) equipped with an integrated touch screen/fingerprint sensor assembly in accordance with some embodiments described herein. As can be seen in FIG. 5, mobile device 500 includes an integrated touch screen/fingerprint detection module assembly 502 as described above in conjunction with FIGS. 2A-2D, 3A-3B, and 4A-4B. Mobile device 500 also includes side buttons 504 and 506, some of which can be configured to control the fingerprint sensing and detection operations. The location of the fingerprint detection module (not visible) is marked on the cover glass with mark 508. The integrated touch screen/fingerprint detection module assembly 502 also provides other structure positions for other sensors, such as sensor 510.

Figure 6:
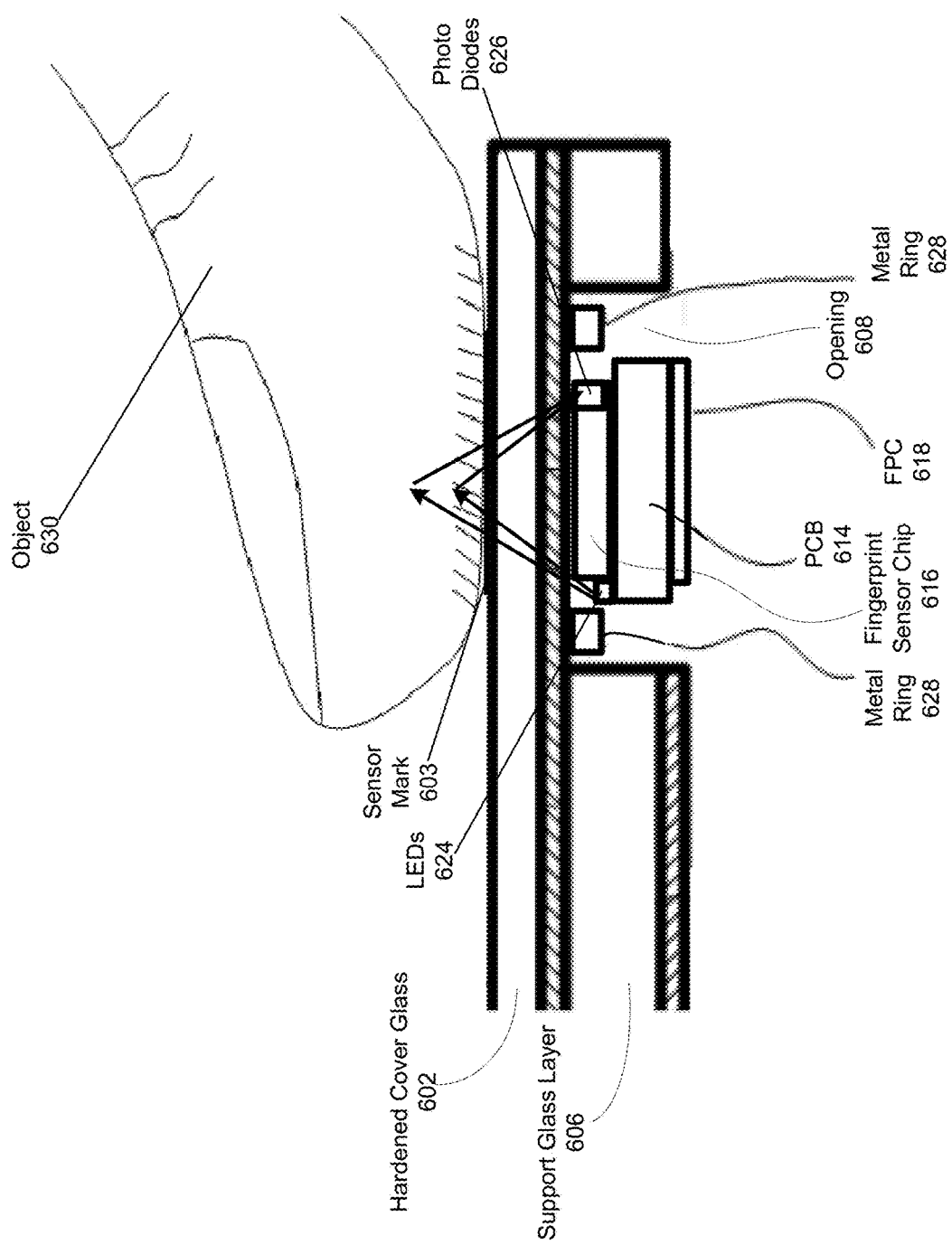
FIG. 6 illustrates ae concept of using an integrated touch screen/fingerprint sensor assembly for fingerprint authentication in accordance with some embodiments described herein.

FIG. 6 illustrates the concept of using an integrated touch screen/fingerprint sensor assembly (which is substantially similar to the integrated touch screen/fingerprint sensor assembly in FIG. 2B) for fingerprint authentication in accordance with some embodiments described herein.

As mentioned above, the fingerprint detection module in the integrated touch screen/fingerprint sensor assembly is placed inside opening 608 of support glass layer 606. Fingerprint detection module includes a PCB 614, a fingerprint sensor chip 616, and a FPC 618, wherein fingerprint sensor chip 616 is surrounded by a metal ring 628. Furthermore, fingerprint detection module includes one or more LEDs 624 which are affixed on the top surface of PCB 614 and one or more photo diodes 626 which are integrated with fingerprint sensor chip 616.

In some implementations, when an object 630, such as a human finger, makes contact with hardened cover glass 602 at a location indicated by a sensor mark 603, metal ring 628 detects the capacitive coupling signal through hardened cover glass 602 and activates LEDs 624 to emit detection light. The detection light is reflected off object 630 and the reflected light can be received and measured by photo diodes 626. Hence, LEDs 624, photo diodes 626, and a signal processing module (not shown) collectively determine if object 630 is human by measuring human bio-feature signals, such as heartbeat, oxygen saturation level of the user's blood ($SpO_2$), among others. Once the human detection process is complete, the standard fingerprint authentication process can begin using the fingerprint detection module.

The various implementations of the touch screen/fingerprint sensor assembly in this patent document can be used in various systems and devices including, but are not limited to, mobile phones, tablet computer, portable computers, wireless devices, laptops, game machines, and multimedia device.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is what is disclosed or illustrated, including:

1. A touch screen assembly for a mobile device, comprising:
   a hardened cover glass at a top layer of the touch screen assembly;
   a support glass layer directly underneath the hardened cover glass and including an opening through the support glass layer, wherein the hardened cover glass and the support glass layer are bonded together to provide a mechanical strength for supporting the touch screen assembly; and
   a fingerprint detection module positioned within the opening of the support glass layer and directly underneath the hardened cover glass.

2. The touch screen assembly of claim 1, further comprising a fingerprint sensor mark formed on the surface of the hardened cover glass and located directly above the fingerprint detection module to indicate the position of the fingerprint detection module.

3. The touch screen assembly of claim 1, further comprising a colored layer sandwiched between the hardened cover glass and the support glass layer, wherein the fingerprint detection module is attached to an area of the colored layer exposed by the opening support glass layer.

4. The touch screen assembly of claim 3, wherein the colored layer has a color, a pattern, or both the color and the pattern to make the fingerprint detection module invisible from a user looking at the touch screen assembly from above the hardened cover glass.

5. The touch screen assembly of claim 3, further comprising an adhesive layer on the underside of the colored layer for attaching the fingerprint detection module to the colored layer.

6. The touch screen assembly of claim 1, wherein a boundary around the fingerprint detection module is not in contact with a sidewall of the opening.

7. The touch screen assembly of claim 1, further comprising a transparent conducting film (TCF) layer on a bottom surface of the support glass layer.

8. The touch screen assembly of claim 7, wherein the TCF layer includes an indium tin oxide (ITO) layer.

9. The touch screen assembly of claim 4, wherein the fingerprint detection module further comprises:
   a printed circuit board having integrated circuits; and
   a fingerprint sensor chip for collecting fingerprint data, wherein a first side of the fingerprint sensor chip is affixed to the printed circuit board and a second side of the fingerprint sensor chip is attached to an underside of the colored layer.

10. The touch screen assembly of claim 9, wherein the fingerprint detection module further includes a flexible printed circuit on an underside of the printed circuit board for coupling fingerprint sensor signals collected by the fingerprint sensor chip to the mobile device.

11. The touch screen assembly of claim 9, wherein the fingerprint detection module further includes a metal ring structure placed around the fingerprint sensor chip and formed on the underside of the colored layer providing the color, pattern, or both color and pattern, wherein the metal ring is part of a capacitive touch sensor to detect contact by an object at the hardened cover glass.

12. The touch screen assembly of claim 9, wherein the fingerprint detection module further comprises include:
   one or more light emitting sources configured to emit light; and
   one or more biosensors configured to monitor one or more human bio-feature signals.

13. The touch screen assembly of claim 12, wherein the human bio-feature signals include one or more of a heartbeat signal and an oxygen saturation level of blood.

14. The touch screen assembly of claim 12, wherein the one or more biosensors comprises one or more photodetectors.

15. The touch screen assembly of claim 12, wherein the one or more light emitting sources include one or more light emitting diodes (LEDs).

16. The touch screen assembly of claim 1, wherein the hardened cover glass has a thickness between 100 µm and 400 µm.

17. The touch screen assembly of claim 1, wherein the support glass layer has a thickness between 100 µm and 550 µm.

18. The touch screen assembly of claim 1, wherein the hardened cover glass eliminates an opening for fitting a fingerprint detection module through the hardened cover glass.

19. The touch screen assembly of claim 1, wherein the support glass layer is not hardened.

20. The touch screen assembly of claim 1, wherein the fingerprint detection module is structured to including a light source that emits light towards a finger, one or more photodetectors to detect returned light from the finger and a signal processing module to process information in the detected returned light to monitor a human bio-feature signal to determine whether the finger is from a human.

21. The touch screen assembly of claim 20, wherein the human bio-feature signal indicates a heartbeat or an oxygen saturation level in blood.

22. A touch screen device, comprising:
   a frame;
   a touch screen assembly surrounded and secured by the frame, wherein the touch screen assembly comprises:
      a hardened cover glass at a top layer of the touch screen assembly and for receiving contact by an object;
      a support glass layer directly underneath the hardened cover glass and including an opening through the support glass layer, wherein the hardened cover glass and the support glass layer are bonded together to provide mechanical strength for the touch screen assembly; and a fingerprint detection module positioned within the opening of the support glass layer and directly underneath the hardened cover glass; and a main circuit board between the touch screen assembly and the back cover of the frame, wherein the fingerprint detection module is structured to emit light towards a finger, and including one or more photodetectors to detect returned light from the finger and a signal processing module to process information in the detected returned light to monitor a human bio-feature signal to determine whether the finger is from a human.

23. The touch screen device of claim 22, wherein the touch screen assembly further comprises a fingerprint sensor mark formed on the surface of the hardened cover glass and located directly above the fingerprint detection module to indicate the position of the fingerprint detection module.

24. The touch screen device of claim 22, wherein the touch screen assembly further comprises a colored layer sandwiched between the hardened cover glass and the support glass layer, wherein the fingerprint detection module is attached to an area of the colored layer exposed by the opening of the support glass layer.

25. The touch screen device of claim 24, wherein the colored layer has a color or a pattern, or both, the color and the pattern to make the fingerprint detection module invisible from a user looking at the touch screen assembly from above the hardened cover glass.

26. The touch screen device of claim 24, wherein the touch screen assembly further comprises an adhesive layer for bonding the fingerprint detection module to the colored layer.

27. The touch screen device of claim 22, wherein a boundary around the fingerprint detection module is not in contact with a sidewall of the opening.

28. The touch screen device of claim 22, wherein the touch screen assembly further comprises a transparent conducting film (TCF) layer on a bottom surface of the support glass layer.

29. The touch screen device of claim 28, wherein the TCF layer includes an indium tin oxide (ITO) layer.

30. The touch screen device of claim 25, wherein the fingerprint detection module further comprises:
    a printed circuit board having integrated circuits; and
    a fingerprint sensor chip for collecting fingerprint data, wherein a first side of the fingerprint sensor chip is affixed to the printed circuit board and a second side of the fingerprint sensor chip is attached to an underside of the colored layer.

31. The touch screen device of claim 22, wherein the fingerprint detection module further includes a flexible printed circuit on an underside of the printed circuit board for coupling fingerprint sensor signals collected by the fingerprint sensor chip to an electronic device.

32. The touch screen device of claim 22, wherein the fingerprint detection module further includes a metal ring structure placed around the fingerprint sensor chip and formed on the underside of the colored layer, wherein the metal ring is part of a capacitive touch sensor to detect contact by an object at the hardened cover glass.

33. The touch screen device of claim 22, further comprising one or more buttons on one or more sides of the frame for controlling operations of the fingerprint sensor.

34. The touch screen device of claim 22, wherein the hardened cover glass has a thickness between 100 μm and 400 μm.

35. The touch screen device of claim 22, wherein the support glass layer has a thickness between 100 μm and 550 μm.

36. The touch screen device of claim 22, wherein the hardened cover glass eliminates an opening for fitting a fingerprint detection module through the hardened cover glass.

37. The touch screen device of claim 22, wherein the support glass layer is not hardened.

38. The touch screen device of claim 22, wherein the fingerprint detection module includes one or more LED lights to emit the light towards a finger.

39. A method for assembling a touch screen assembly, comprising:
    preparing hardened cover glass without forming an opening for accommodating a fingerprint detection module;
    preparing a support glass layer including in the support glass an opening for a fingerprint detection module;
    bonding the hardened cover glass to the support glass layer, wherein the hardened cover glass and the support glass layer collectively provide a mechanical strength for supporting the touch screen assembly; and
    placing the fingerprint detection module within the opening of the support glass layer and attaching the fingerprint detection module directly underneath the hardened cover glass.

40. The method of claim 39, including:
    disposing a colored layer sandwiched between the hardened cover glass and the support glass layer, wherein the fingerprint detection module is attached to an area of the colored layer exposed by the opening support glass layer.

41. A touch screen device, comprising:
    a touch screen including one or more touch sensitive layers which define a touch sensitive area;
    a fingerprint sensor module near a touch sensitive area, the fingerprint detection module structured to emit light towards a finger, and including one or more photodetectors to detect returned light from the finger and a signal processing module to process information in the detected returned light to monitor a human bio-feature signal to determine whether the finger is from a human;
    a hardened cover glass having a spatially contiguous glass surface to fully cover both the touch sensitive area and the fingerprint sensor module; and
    a support glass layer directly underneath the hardened cover glass and in directly contact with the one or more touch sensitive layers, wherein the support glass layer includes an opening through the support glass layer, wherein the hardened cover glass and the support glass layer are bonded together to provide a mechanical strength for the touch screen, and wherein the fingerprint sensor module is positioned within the opening of the support glass layer and directly underneath the hardened cover glass to sense an object through the hardened cover glass.

42. The device of claim 41, wherein the device includes one or more of a mobile phone, a tablet computer, a portable computer, a wireless device, a laptop, a game machine, or a multimedia device.

43. The touch screen device of claim 41, wherein the fingerprint detection module includes one or more LED lights to emit the light towards a finger.

* * * * *